United States Patent
Katsavounidis et al.

(10) Patent No.: US 8,121,196 B2
(45) Date of Patent: Feb. 21, 2012

(54) METHOD AND APPARATUS FOR MULTI-THREADED VIDEO DECODING

(75) Inventors: Ioannis Katsavounidis, Fremont, CA (US); Yu-Nien Chien, Fremont, CA (US); Chun-Huan Chuang, Fremont, CA (US); Chung-Tao Chu, Fremont, CA (US); Te-Chien Chen, Fremont, CA (US)

(73) Assignee: Corel Corporation, Ottawa (CA)

( * ) Notice: Subject to any disclaimer, the term of this patent is extended or adjusted under 35 U.S.C. 154(b) by 1511 days.

(21) Appl. No.: 11/556,161

(22) Filed: Nov. 2, 2006

(65) Prior Publication Data

US 2008/0107184 A1    May 8, 2008

(51) Int. Cl.
*H04B 1/66*    (2006.01)
(52) U.S. Cl. ......... 375/240.25; 375/240.26; 375/240.28; 375/240.01; 382/233; 382/235; 382/234
(58) Field of Classification Search ............. 375/240.25, 375/240.26, 240.28, 240.01; 382/233, 235, 382/234
See application file for complete search history.

(56) References Cited

U.S. PATENT DOCUMENTS

| 5,768,429 | A | * | 6/1998 | Jabbi et al. | 382/233 |
| 6,862,278 | B1 | * | 3/2005 | Chang et al. | 370/389 |
| 7,627,039 | B2 | * | 12/2009 | Lillevold | 375/240.25 |
| 2005/0053157 | A1 | | 3/2005 | Lillevold | |

* cited by examiner

*Primary Examiner* — Shawn An
(74) *Attorney, Agent, or Firm* — Mark J. Danielson; Pillsbury Winthrop Shaw Pittman LLP (57) ABSTRACT

A method and an apparatus for performing multi-threaded video decoding are disclosed. The method takes use of a multi-threaded scheme to process an encoded picture stream on a picture by picture basis. In the method, multiple threads are used for performing video decoding at the same time, such as one thread for the operation of parsing input bits into syntax elements of one picture implemented by the first thread, another thread for the operation of decoding the parsed syntax elements of another picture into pixel values implemented by the second thread, and the other threads for the operations of the non-reference picture, such as bidirectional predictive picture, including parsing input bits into syntax elements and the subsequent operation of decoding the parsed syntax elements into pixel values. Therefore, the decoding speed is substantially increased, and the decoding efficiency is enhanced.

5 Claims, 8 Drawing Sheets

METHOD AND APPARATUS FOR MULTI-THREADED VIDEO DECODING

BACKGROUND OF THE INVENTION

1. Field of the Invention

The present invention generally relates to a method and an apparatus for performing video decoding, in particular, to a method and an apparatus for performing multi-threaded video decoding. The present invention also relates to a computer-readable memory in which a program used for such apparatus and method has been stored.

2. Description of Related Art

Compression of digital video data is used for many applications including transmission over bandwidth-constrained channels, such as direct broadcast satellite, and storage on optical media. In order to achieve very efficient compression, complex, computationally intensive processes are used for encoding and decoding video. For example, although MPEG-2 (Moving Pictures Expert Group) is known as a very efficient method for compressing video, a new, more efficient standard, H.264 (Advanced Video Coding) is being developed.

The AVC standard uses a number of techniques to compress video streams, such as motion-based compensation to reduce temporal redundancy. The AVC standard encodes each frame using three main picture types—intra-coded pictures (I-pictures), inter-coded pictures (P-pictures), and Bi-predictive (B-pictures). I-pictures are coded without reference to other pictures and can provide access points to the coded sequence where decoding can begin. P-pictures are coded more efficiently using motion compensation prediction of each block of sample values from some previously decoded picture selected by the encoder. B-picture uses both forward and backward motion compensated prediction, and both previous and future frames are used as reference frames. B-pictures may be predicted using a weighted average of two blocks of motion-compensated sample values.

The H.264 standard allows for using a large number of reference frames to reconstruct a single picture and using reordering schemes that transmit many "future frames" with a display schedule later than a current picture before the current picture is transmitted. By contrast, MPEG-1 and MPEG-2 allow for at most two reference frames for reconstructing a picture and only a single future frame.

Decoding video often involves processing the video as a stream of pictures, each of which may be a field or a frame (typically consisting of two interleaved fields). Each field or frame further includes a number of slices of macroblocks (MBs), wherein a slice is a sequence of macroblocks, and the slice has a flexible size. In case of multiple slice groups, the allocation of the macroblocks is determined by a macroblock to slice group map that indicates which slice group that each macroblock belongs to. The video sequence is read blockwise; and an interface is offered for bitwise stream reading as well as parsing of common syntax elements, such as Exp-Golomb codes and static code tables.

In various video encoding/decoding standards, the video encodings are organized in accordance with certain syntactical rules, which may also be referred to as the syntax elements. In a video codec, such as H.264/AVC, the syntax elements at and below the slice layer are adaptively coded. The syntax elements include higher-layer syntax elements for video sequence, picture, and slice headers, slice payload data, reference frame indexes, and so forth.

Figure 1:
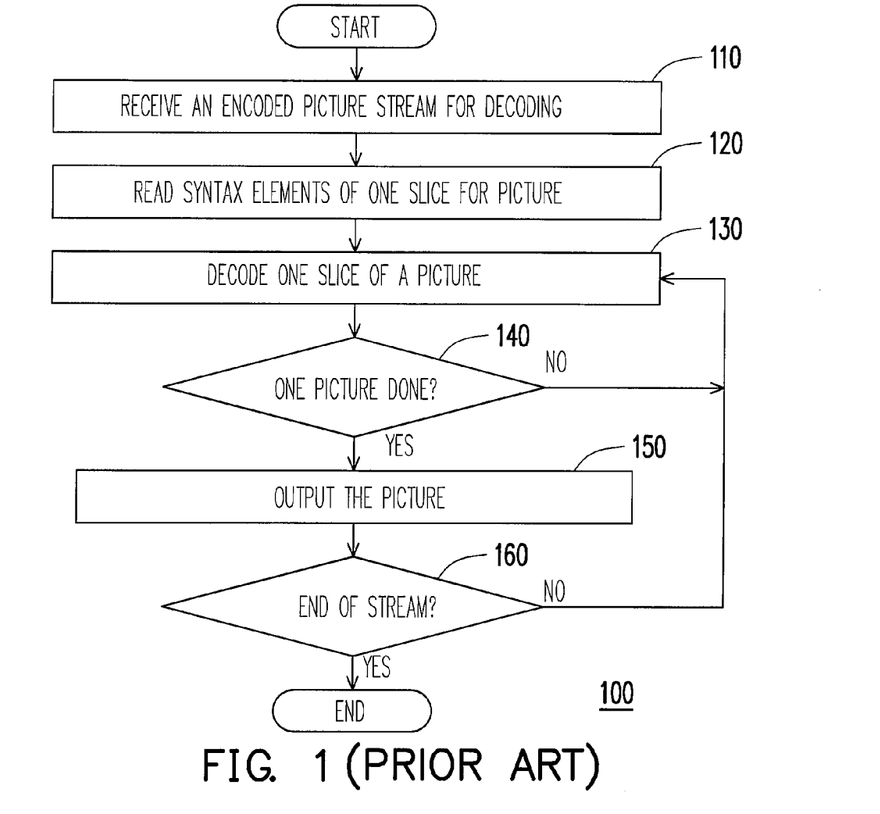
FIG. 1 is a flowchart illustrating a conventional process for decoding picture stream.

FIG. 1 is a flowchart illustrating a conventional process for decoding picture stream. The conventional decoding process only decodes the picture stream serially, and the picture stream may include one or more slices of pictures. Referring to FIG. 1, the process 100 is carried out by a video decoder. In step 110, a video stream is received by the video decoder either from a network or from an external storage device. In step 120, the picture header and slice header are read to obtain information of the target slice, and the syntax elements of one slice of a picture are read.

In step 130, the decoder is initialized to decode the slice of the picture; following by step 140, it is determined whether all of the slices of the picture have been decoded. If so, the decoded data of the picture is outputted (step 150). Otherwise, the process 100 returns to step 130 for decoding the next slice of the picture. In step 160, the end of the picture stream is detected. If not, the process returns back to step 130 for decoding one slice of the picture. Finally, if all the pictures in the stream are decoded, the process 100 is completed.

Figure 2:
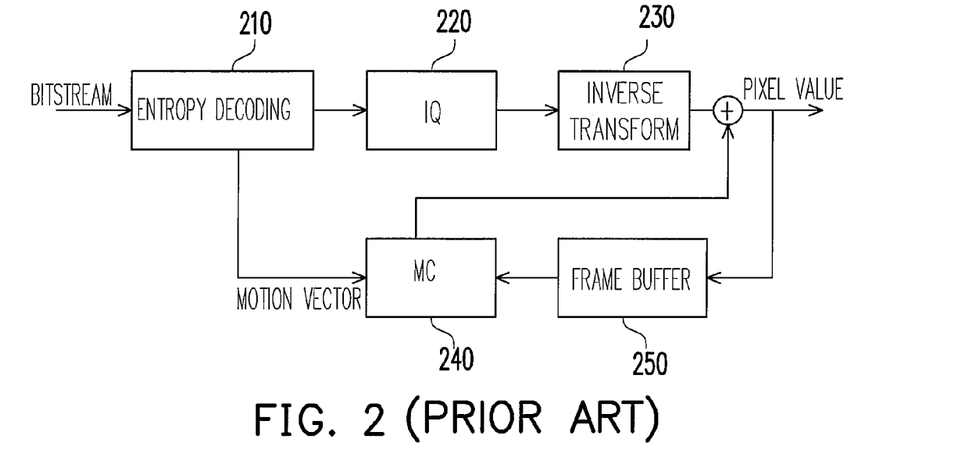
FIG. 2 is a schematic diagram illustrating a conventional video decoding process.

FIG. 2 is a schematic diagram illustrating a conventional video decoding process. In detail, the decoding process of each picture of a video further contains several essential procedures, such as entropy decoding, inverse quantization (IQ), inverse transform, which can be in the form of inverse discrete cosine transform (IDCT) used in MPEG-1, MPEG-2 and MPEG-4 or Hadamard-like integer transform used in H.264, and motion compensation (MC). Referring to FIG. 2, an entropy decoding 210 process is executed, when a bitstream of a video is inputted. In the entropy decoding 210 process, the input bits are parsed into syntax elements by referring to code tables or Exp-Golomb codes due to the codec type. The syntax elements include information of a picture or a slice and motion vectors, wherein the aforementioned information is used to determine the picture type while the motion vectors are adopted for motion compensation.

After the entropy decoding process, each macroblock in the bitstream is processed through inverse quantization (IQ) 220 and inverse transform 230, and the macroblock is transformed into pixel values in spatial domain. For a reference picture (I picture), the result of transformation is optionally—and for the case of H.264 only—added to the prediction information that comes from a directional index (0-8) that is part of the Intra-MB information. This index corresponds to 8 possible prediction directions and 1 average (also known as DC) mode that form pixel prediction for the current block from neighboring pixel values. A duplicate of the pixel data is stored in a frame buffer 250 as the reference of motion compensation for the subsequent predictive pictures.

For a predictive picture (P picture or B picture), the motion vectors obtained by the entropy decoding 210 process are used to search for the corresponding reference picture. The predictive differences transformed by IQ 220 and inverse transform 230 are added to the reference picture to compose the predictive picture. Similar to reference (I) picture, the decoded pixel values of the predictive picture is outputted, and its duplicate is also sent to the frame buffer 250 for storage.

According to the forgoing description, the video decoding may be predictive and need to make forward or backward references to other pictures. However, conventional video decoders are adapted to decode slices of a video serially, so decoding efficiency in conventional video processing systems is substantially not efficient when executed on computing systems with parallel computational ability.

With the rollout of multi-threaded processor, decoding of video slices in parallel can be implemented and executed in multiple threads. The present invention may be employed to significantly improve the efficiency of decoding process by a combination of the multi-threaded processor with innovative software solutions.

Further, limitations of conventional approaches will become apparent to one of skill in the art, through comparison of such method with some embodiments of the present invention as set forth in the remainder of the present application with reference to the drawings.

SUMMARY OF THE INVENTION

To achieve the above and/or other aspects and advantages, embodiments of the present invention set forth a method and apparatus capable of performing multi-threaded video decoding for improving decoding efficiency. The decoding method processes a picture stream in a parallel manner based on the type of picture, such as reference picture or non-reference picture, the slice type of picture such as single-slice or multi-slice picture, and the like.

According to the first aspect of the present invention, a method for performing multi-threaded video decoding is provided, comprising: parsing input bits of a first picture of encoded picture streams into a plurality of syntax elements of the first picture, decoding the syntax elements of the first picture into pixel values and parsing the input bits of a second picture of encoded picture streams into a plurality of syntax elements of the second picture in a parallel manner, and then while the operation of parsing input bits of the second picture of encoded picture streams into a plurality of syntax elements of the second picture has been completed, it is determined whether the second picture has dependency on one or more other pictures. If the second picture has no dependency on one or more other pictures, the method will proceed to decode the syntax elements of the second picture of encoded picture streams into pixel values directly. If the second picture has dependency on one or more other pictures, the operation of decoding the syntax elements of the second picture into pixel values will be operated until the one or more other pictures referred by the decoding operation of the second picture have been decoded. Accordingly, the second picture of encoded picture streams referring to one or more other pictures may be decoded.

According to the second aspect of the present invention, there is provided a method for performing multi-threaded video decoding, comprising: receiving encoded picture streams for decoding, finding a reference picture from the header information of encoded picture stream, and processing the following steps in a parallel manner including parsing input bits of a current reference picture into a plurality of syntax elements, decoding the parsed syntax elements of the preceding reference picture into pixel values, and processing a plurality of non-reference pictures. Moreover, the step of processing a plurality of non-reference pictures is to parse input bits of one non-reference picture into a plurality of syntax elements and to decode the parsed syntax elements of the non-reference picture into pixel values while the one or more other pictures referred by the decoding of the non-reference picture have been decoded. In each of the above-described processing steps, further includes the step of determining whether the picture includes multiple slices, if so, processing the multi-slice picture of encoded picture streams with multiple threads, otherwise, it is considered to process a single-slice picture with one thread for each different picture in parallel manner.

According to the third aspect of the present invention, there is provided an apparatus for performing multi-threaded video decoding, comprising: a first decoding unit parsing input bits of encoded picture streams into syntax elements and a second decoding unit decoding the syntax elements into pixel values, each of which has multiple threads for processing different pictures or different slices in parallel manner. Further, the first decoding unit and the second decoding unit can be operated simultaneously respectively for different picture. Accordingly, a picture stream can be processed with multiple threads, so as to accelerate the speed of decoding process.

According to the fourth aspect of the present invention, there is provided an apparatus for performing multi-threaded video decoding, comprising: a receiving unit receiving encoded picture streams for decoding, a finding unit finding a reference picture from header information of encoded picture streams, a first decoding unit parsing input bits of encoded picture streams into syntax elements, a second decoding unit decoding the syntax elements into pixels, and a determining unit determining whether the picture of encoded picture streams includes multiple slices. If the picture of encoded picture streams is determined to be a multiple-slice picture, the first decoding unit and the second decoding unit will be used with multiple threads to process multiple slices of the picture in parallel manner, otherwise, the first decoding unit and the second decoding unit are performed respectively by one thread for each different picture.

The apparatus for performing multi-threaded video decoding according to an embodiment of the present invention, wherein the apparatus comprises one of a personal computer, a portable computer, a mobile phone, a digital personal assistant, a digital versatile disk player, or a television.

According to the fifth aspect of the invention, there is provided a computer-readable medium in which a program for performing multi-threaded video decoding process has been stored, wherein the program comprises: a first thread executing program instructions for parsing input bits of said target picture of encoded picture streams into a plurality of syntax elements, wherein said target picture comprises one of an intra-coded picture (I picture) and a predictive picture (P picture); a second thread executing program instructions for decoding the plurality of syntax elements of said target picture into pixel values after the operation of parsing input bits of said target picture of encoded picture streams into the plurality of syntax elements has been completed by the first thread; a third thread executing program instructions for parsing input bits of a target picture of encoded picture streams into a plurality of syntax elements and subsequently decoding the plurality of syntax elements of the target picture into pixel values, wherein the target picture is a bidirectional predictive picture (B picture) and all pictures referred by the target picture have been previously decoded completely by the aforementioned second thread; and a fourth thread executing program instructions for parsing input bits of a target picture of encoded picture streams into a plurality of syntax elements and subsequently decoding the plurality of syntax elements of the target picture into pixel values, wherein the target picture is another bi-directional predictive picture (B picture) that is distinct from the picture processed by the third thread, and all pictures referred by the target picture have been previously decoded completely by the aforementioned second thread.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

As seen in FIG. 2, the bitstream is decoded picture by picture since the processor can only be operated in a single thread. However, with the multi-threaded processor being presented to the public, the decoding of pictures of a video can be implemented by multiple decoding units or decoding instructions that can be executed in multiple threads. The present invention applies such multi-threaded scheme to effectively accelerate the decoding speed.

Figure 3:
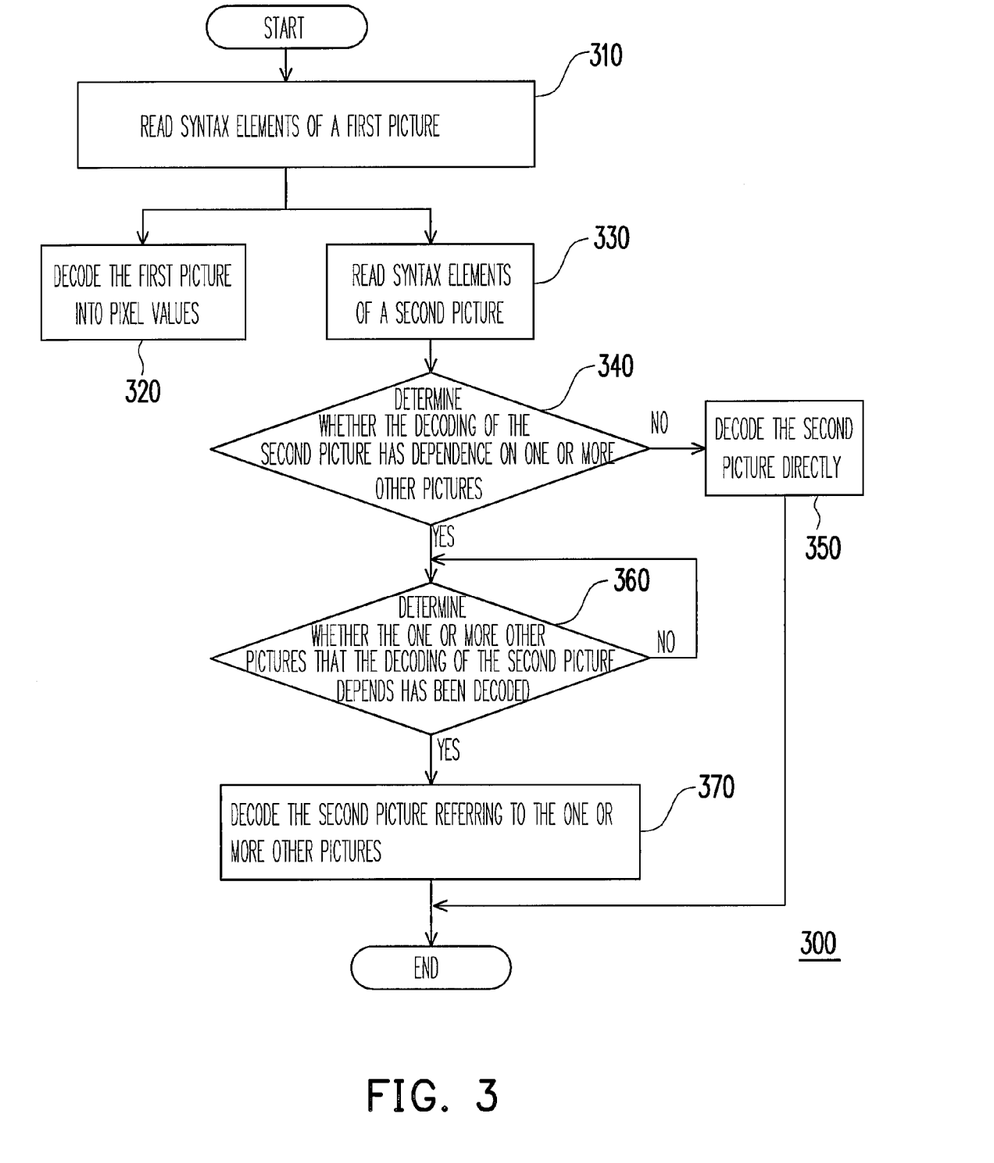
FIG. 3 is a flowchart illustrating a method for performing multi-threaded video decoding according to an embodiment of the present invention.

FIG. 3 is a flowchart illustrating a method for performing multi-threaded video decoding according to an embodiment of the present invention. Referring to FIG. 3, the decoding process 300 is carried out by a video decoder with multiple threads. When a bitstream of a video is inputted into the video decoder, the syntax elements of a first picture are parsed (step 310). The syntax elements include the information of the first picture, such as picture start code (PSC), temporal reference (TR), picture type, motion vector type, motion vectors, and so on.

Next, one thread of the decoding process starts to decode the first picture into a plurality of pixel values based on the parsed syntax elements of the first picture (step 320). In the meantime, the input bits of a second picture of encoded picture streams are parsing into the syntax elements of a second picture by another thread of the decoding process (step 330).

Before the decoding process starts to decode the second picture, it is determined whether the decoding operation of the second picture has dependency on one or more other pictures (step 340). If no dependency is found, the decoding process will decode the second picture directly (step 350). However, if the decoding operation of the second picture has dependency on the other pictures, the decoding process will further determine whether the one or more other pictures referred by the decoding of the second picture have been decoded already or not (step 360).

If the decoding of the dependent pictures is not yet completed, the decoding of the second picture will be postponed until all the reference pictures have been decoded. Then the decoder starts to decode the second picture by referring to the dependent pictures (step 370).

In the aforesaid decoding process, the pictures that depend on more than one reference picture are typically referred to as the non-reference pictures, since they are themselves not used for prediction purposes by any other picture. This is the common practice of most international standards followed by digital television and optical storage disks such as DVD, High-definition disks (HD-DVD) and Blue-ray disks (BD). More precisely, they are defined as a bidirectional predictive picture (B picture) according to the standard video codec. Wherein, the forward predictive picture needs to make forward reference to a preceding intra-coded picture or another forward predictive picture.

Similarly, the bidirectional predictive picture is required to make forward and backward reference to other intra-coded pictures or forward predictive pictures. Therefore, if the aforementioned second picture is a bidirectional predictive picture, the decoding process will further determine whether the one or more other pictures forward and backward referred by the decoding of the second picture have been decoded because the decoding operation of the second picture has dependency on the other pictures. Once the reference pictures have been decoded, the decoder may assign one thread to do the whole operations including parsing input bits into a plurality of syntax elements of the bidirectional predictive picture and the subsequent operation of decoding the parsed syntax elements into pixel values. Accordingly, a decoding process with the highest decoding speed is obtained.

To sum up, in the present invention, multiple threads are used for performing video decoding at the same time, such as the operation of parsing input bits into syntax elements of one picture implemented by the first thread, the operation of decoding the parsed syntax elements of another picture into pixel values implemented by the second thread, and the whole operations including parsing input bits into syntax elements and the subsequent operation of decoding the parsed syntax elements into pixel values of the bidirectional predictive picture implemented by the third thread. The same process is applied and repeated for decoding the other pictures until all the pictures in the picture stream have been decoded. However, the decoding process may vary for different types of pictures, and usually be implemented in a proper order. Therefore, an embodiment considering all the conditions of decoding pictures is further provided.

Figure 4:
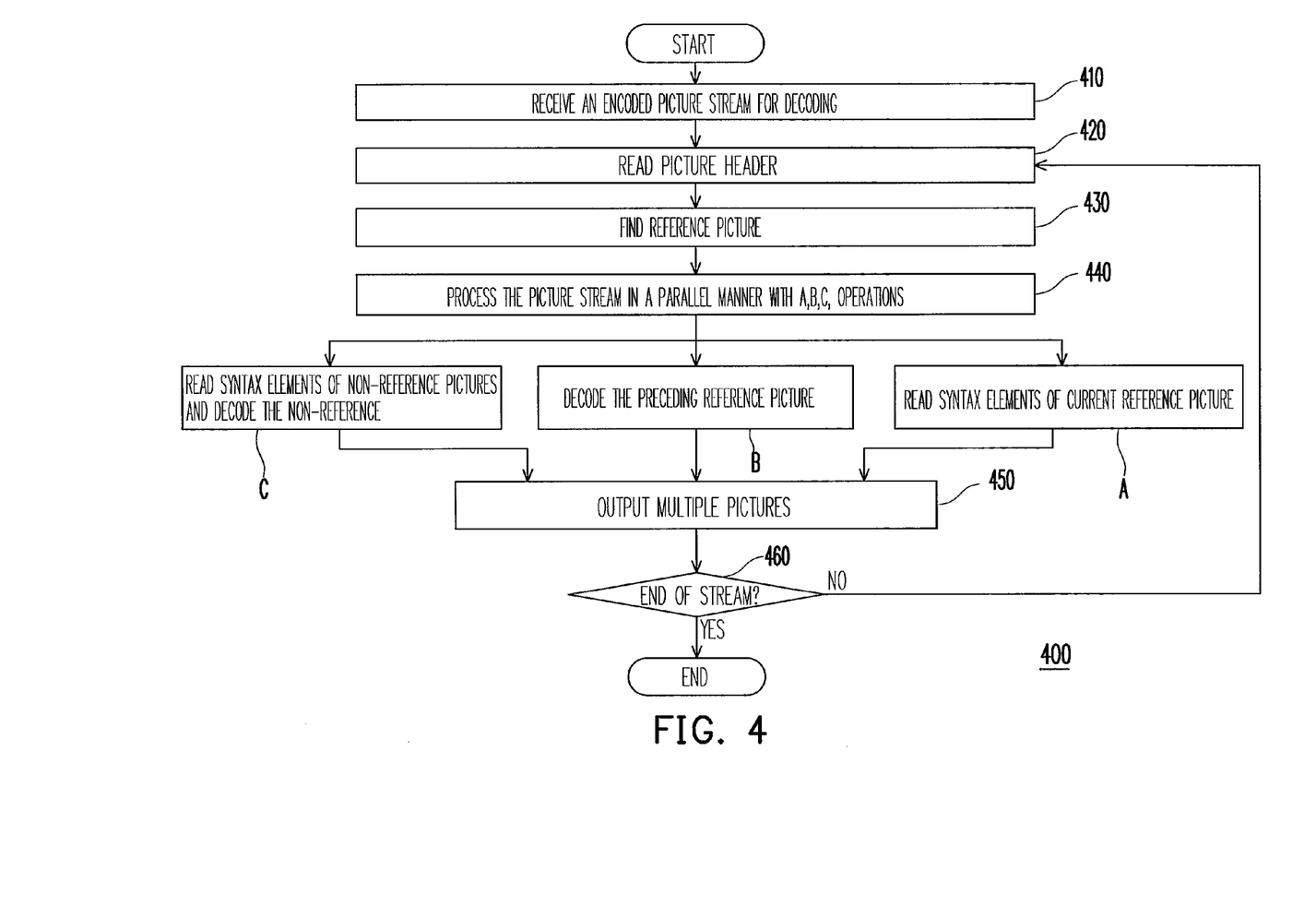
FIG. 4 is a flowchart illustrating a method for performing multi-threaded video decoding according to another embodiment of the present invention.

FIG. 4 is a flowchart illustrating a method for performing multi-threaded video decoding according to another embodiment of the present invention. Referring to FIG. 4, the decoding process 400 is carried out by a video decoder with multiple threads. In step 410, a video stream is received by the video decoder either from a network or from an external storage device. In step 420, the picture header is read by the video decoder to obtain information about the picture. Then, in step 430, the decoder is initialized to find a reference picture. In the present embodiment, the reference picture is an intra-coded picture (I picture) or a predictive picture (P picture).

In step 440, the decoder processes the picture stream in a parallel manner with operations for various pictures, such as reference picture, preceding reference picture, and non-reference picture. The decoder can leverage the decoding process in parallel manner, for example, paring input bits into a plurality of syntax elements of one picture and decoding the parsed syntax elements of another picture into the pixel values. The decoding process can be classified into three conditions (as noted by block A, B, C) due to the different types of pictures.

In block A, the syntax elements of current reference picture is parsing from the input bits; in block B, the preceding reference picture is decoded into pixel values based on its parsed syntax elements; in block C, the syntax elements of the non-reference picture is parsing from the input bits followed by decoding the syntax elements into pixel values of the non-reference picture. Each of these three blocks is implemented with different threads, such that they can be executed in a parallel manner.

After these pictures are decoded, the decoded pixel values are then outputted into buffer memory for display. Meanwhile, the decoder checks whether the decoding process 400 reaches the end of picture stream. If there are still pictures not yet decoded, the decoding process 400 will return back to step 420 for reading the header of a next picture stream. When the decoder detects that the entire picture stream has been decoded, the decoding process 400 is terminated.

In other embodiments, each picture may include multiple slices. In that case, multiple threads can also be used to do the reading operation of the syntax elements or the decoding operation of pictures. The following embodiments are presented to introduce detailed process for the three conditions described in FIG. 4.

Figure 5:
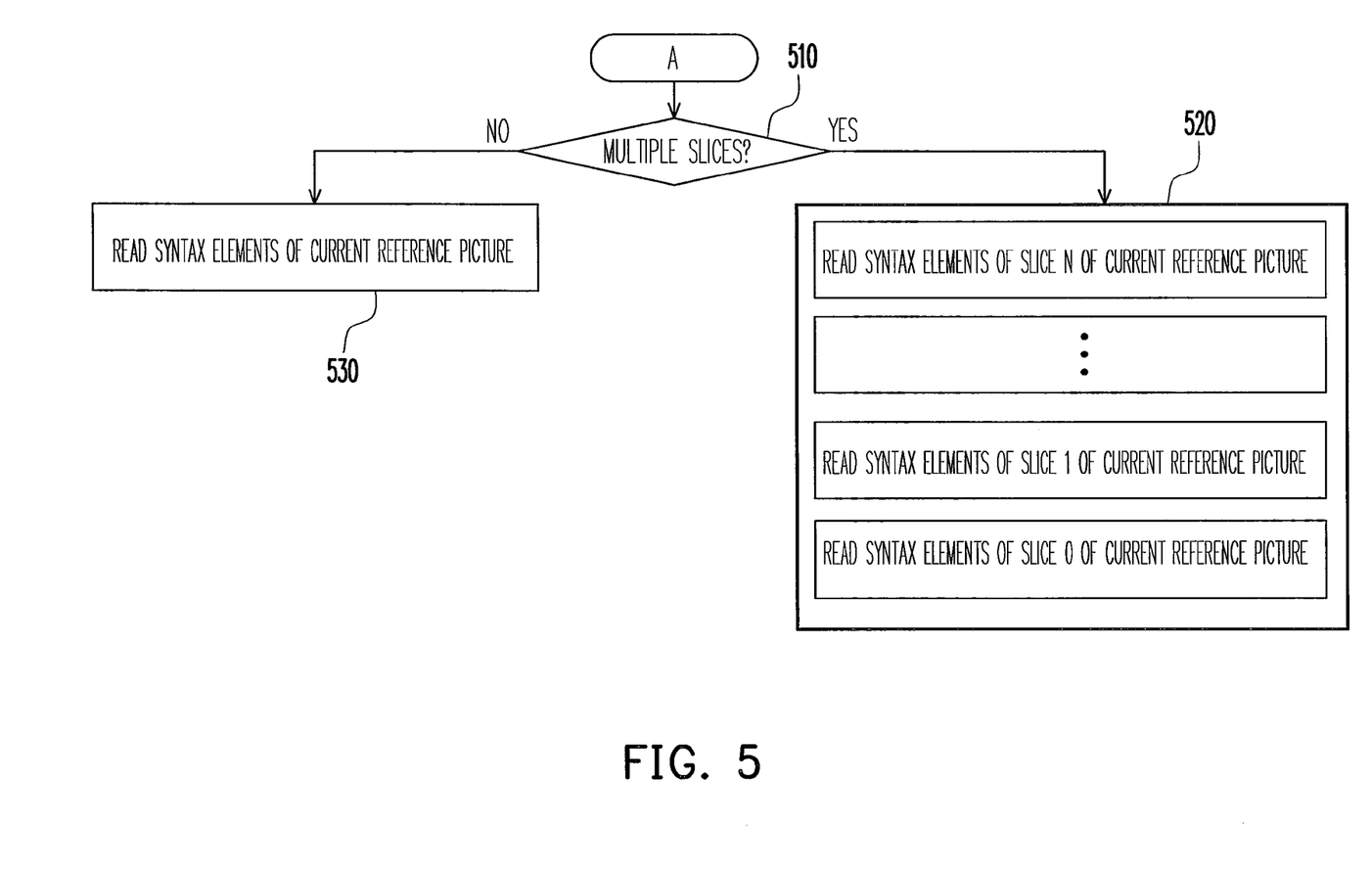
FIG. 5 is a flowchart illustrating the decoding process for the block A shown in FIG. 4.

FIG. 5 is a flowchart illustrating the decoding process for the block A shown in FIG. 4. Referring to FIG. 5, the decoder is going to parse the input bits into the syntax elements of a current reference picture. Accordingly, it is determined whether there are multiple slices in the current reference (step 510). If multiple slices exist, the decoder will use multiple threads (N+1 threads in this embodiment) to do the operation of parsing input bits into the syntax elements of slices (0 to N) of current reference picture in a parallel manner for each slice (step 520). Otherwise, the decoder only needs to use a single thread to do the operation of parsing input bits into the syntax elements of current reference picture (step 530).

Figure 6:
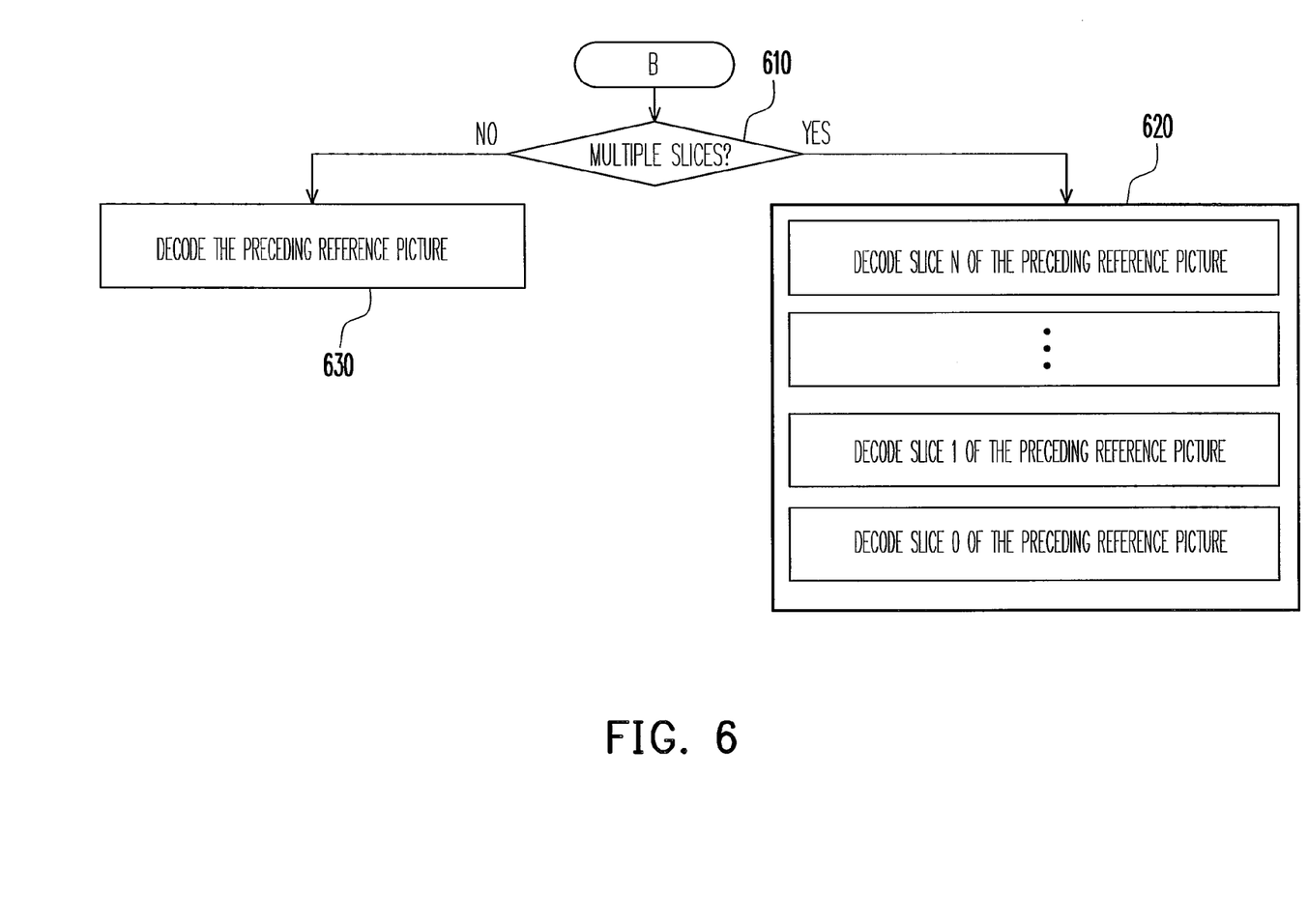
FIG. 6 is a flowchart illustrating the decoding process for the block B shown in FIG. 4.

FIG. 6 is a flowchart illustrating the decoding process for the block B shown in FIG. 4. Referring to FIG. 6, the decoder is going to decode syntax elements into pixel values of a preceding reference picture. Accordingly, it is determined whether there are multiple slices in the preceding reference picture (step 610). If multiple slices exist, the decoder will use multiple threads (N+1 threads in this embodiment) to do the operation of decoding syntax elements into pixel values of slices (0 to N) of the preceding reference picture in a parallel manner for each slice (step 620). Otherwise, the decoder only needs to use a single thread to do the operation of decoding syntax elements into pixel values of the preceding reference picture (step 630).

Figure 7:
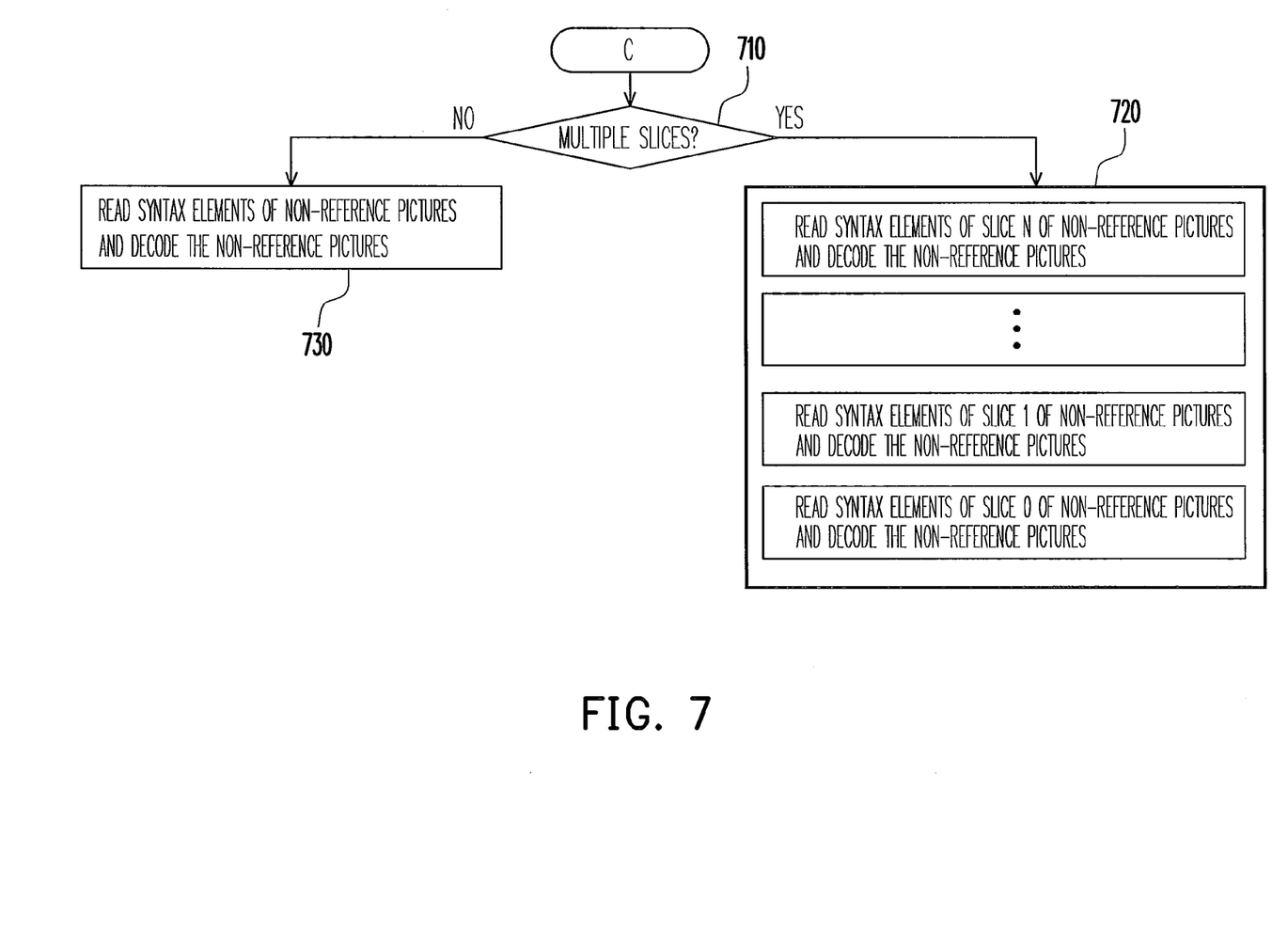
FIG. 7 is a flowchart illustrating the decoding process for the block C shown in FIG. 4.

FIG. 7 is a flowchart illustrating the decoding process for the block C shown in FIG. 4. Referring to FIG. 7, the decoder is going to decode the preceding non-reference picture. Accordingly, it is determined whether there are multiple slices in the non-reference picture (step 710). If multiple slices exist, the decoder will use multiple threads (N+1 threads in this embodiment) to do the operation of parsing input bits into the syntax elements of slices (0 to N) and the subsequent operation of decoding syntax elements into pixel values of slices (0 to N) of the non-reference picture in a parallel manner for each slice (step 720). Otherwise, the decoder only needs to use a single thread to do the operation of parsing input bits into the syntax elements and the subsequent operation of decoding syntax elements into pixel values of the non-reference picture (step 730).

Figure 8:
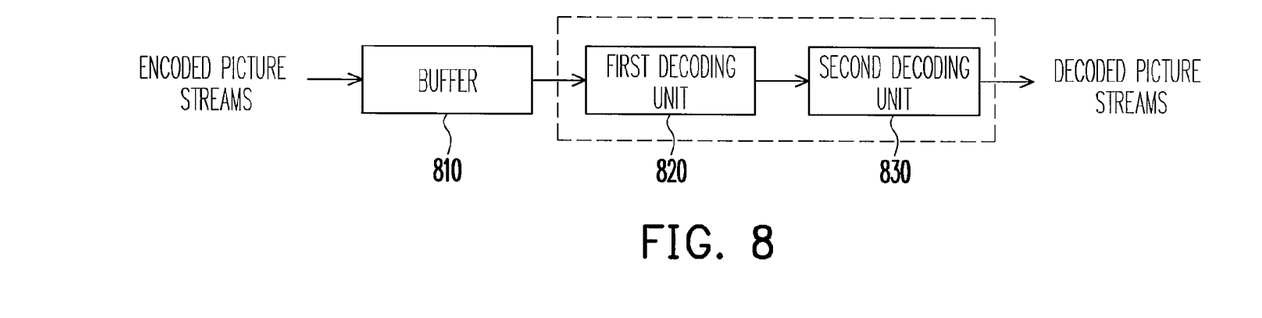
FIG. 8 is a block diagram illustrating the apparatus for performing multi-threaded video decoding according to an embodiment of the present invention.

FIG. 8 is a block diagram illustrating the apparatus for performing multi-threaded video decoding according to an embodiment of present invention. Referring to FIG. 8, the apparatus 800 includes a buffer 810, a first decoding unit 820, and a second decoding unit 830. Additionally, the apparatus can include an addressable storage medium or computer accessible medium, such as random access memory (RAM), an electronically erasable programmable read-only memory (EEPROM), masked read-only memory, one-time programmable memory, hard disks, floppy disks, laser disk players, digital video devices, Compact Disc ROMs, DVD-ROMs, other optical media, video tapes, audio tapes, magnetic recording tracks, electronic networks, and other techniques to transmit or store electronic content such as, by way of example, programs and data. The apparatus 800 may be used or implemented as part of the hardware or software included with a personal computer, a portable computer, a mobile phone, a digital personal assistant, a digital versatile disk player, or a television, but is not limited to them.

A buffer 810 is suitable for receiving and storing the encoded pictures of a video from a network or from an external storage device. A first decoding unit 820 is coupled to the buffer 810 and suitable for parsing the input bits into syntax elements, and a second decoding unit 830 is coupled to the buffer 810 and suitable for decoding syntax elements into pixels value. Significantly, in the present embodiment, when the second decoding unit 830 is decoding the parsed syntax elements of one picture achieved by the first decoding unit 820 into pixels value, the first decoding unit 820 can be parsing the input bits of another picture into syntax elements at the same time Therefore, the video decoding can be divided by two stages, respectively executed by a first decoding unit and a second decoding unit, each of which can be independently operated with multiple threads for different pictures or slices so as to accelerate the speed of decoding process.

Figure 9:
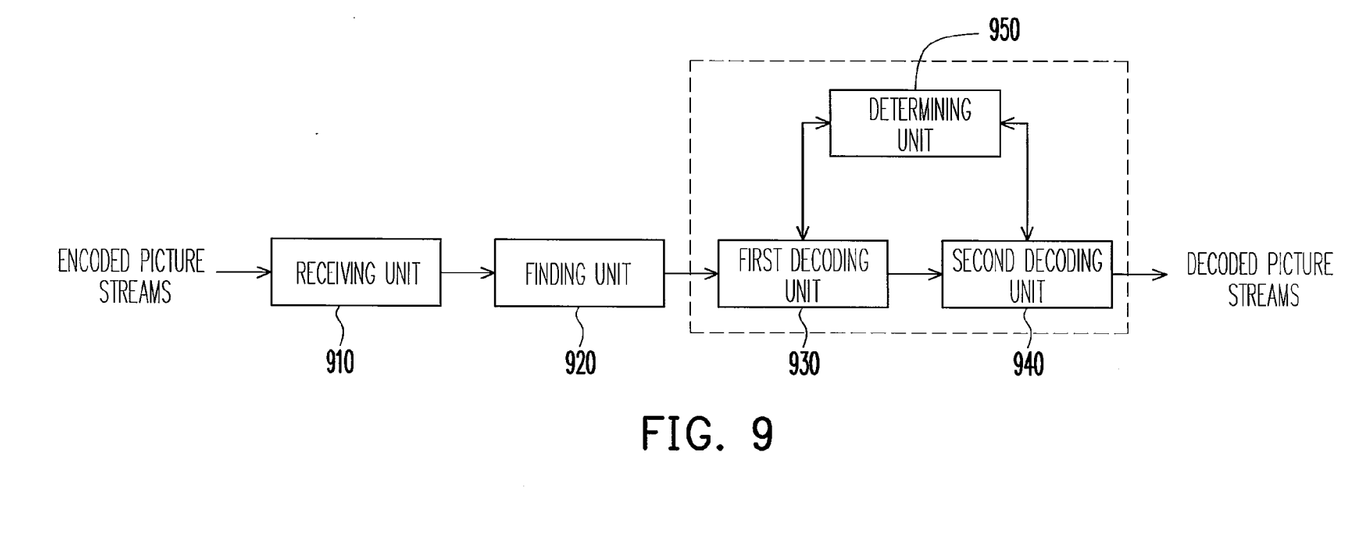
FIG. 9 is a block diagram illustrating the apparatus for performing multi-threaded video decoding according to another embodiment of the present invention.

FIG. 9 is a block diagram illustrating the apparatus for performing multi-threaded video decoding according to another embodiment of the present invention. Referring to FIG. 9, the apparatus includes a receiving unit 910, a finding unit 920, a first decoding unit 930, a second decoding unit 940 and a determining unit 950. The apparatus 900 may be used or implemented as a portable computer, a mobile phone, a digital personal assistant, a digital versatile disk player, or a television, but is not limited to them.

The receiving unit 910 is suitable for receiving and storing the encoded pictures of a video from a network or from an external storage device. The finding unit 920 is suitable for reading header information of encoded picture streams to find a reference picture before starting to perform multi-threaded video decoding. The first decoding unit 930 is suitable for parsing the input bits into syntax elements, and the second decoding unit 940 is suitable for decoding syntax elements into pixels value. The determining unit 950 is coupled to the first decoding unit 930 and the second decoding unit 940, also, the determining unit 950 has two functions, and the first one is to determine whether the picture of encoded picture streams is reference picture or non-reference picture, and the second one is to determine whether the picture of encoded picture streams includes multiple slices. If the picture of encoded picture streams is determined to be a multiple-slice picture, the first decoding unit and the second decoding unit will be used with multiple threads to process multiple slices of the picture in parallel manner.

For example, the picture stream, e.g. IBBPBBP . . . , wherein the I, P, B refers to I picture, P picture, and B picture, respectively, has been received by a receiving unit 910. As defined in the video encoding/decoding standard, the decoding order would be I, P, $B_0$, $B_1$, $P_0$, $B_2$, $B_3$, $P_1$, $B_4$, $B_5$, and $P_2$. Therefore, after a reference I picture has been found by a finding unit 920 from reading header information of encoded picture stream before starting to perform multi-threaded video decoding in the present embodiment, the first decoded picture will be the reference I picture. When the syntax elements of I picture has been achieved by the first decoding unit 930, and the parsed syntax elements of I picture is decoding into pixels values by the second decoding unit 940. Next, when the picture $B_0$ is inputted, due to the B picture is a non-reference picture determined by the determining unit 950, the decoder parses its header of this non-reference picture in order to process it later. Then, the decoder continues to get a next picture, the picture $B_1$ is inputted. It is also a non-reference picture here, so the decoder does the same process as $B_0$. Next, the picture $P_0$ is inputted, the input bits of $P_0$ picture can be parsing into syntax elements by the first decoding unit 930 at the same time while the parsed syntax elements of I picture is decoding into pixels values by the second decoding unit 940.

Then, the decoder continues to get a next picture, the picture $P_1$ is inputted. It is a reference picture, so the input bits of $P_1$ picture can be parsing into syntax elements by the first decoding unit 930 at the same time while the parsed syntax elements of $P_0$ picture is decoding into pixels values by the second decoding unit 940. Because the reference picture of $B_0$ and $B_1$ is $P_0$, and the decoding operation of $B_0$ and $B_1$ must be postponed until $P_0$ is decoded completely, that is, when the decoder continues to get a next picture, a non-reference picture $B_4$ is inputted, parses its header of this non-reference picture in order to process it later. Subsequently, one more non-reference picture $B_5$ is inputted, so the decoder does the same process as $B_4$. Next, the picture $P_2$ is inputted, at this moment, $P_0$ is decoded by the second decoding unit 940 completely so that when the input bits of $P_2$ picture can be parsing into syntax elements by one thread of the first decoding unit 930 and the syntax elements of $P_1$ picture is decoding into pixels values by the second decoding unit 940, the input bits of $B_0$ and $B_1$ would need respectively one thread of the first decoding unit 930 to performing the parsing operation of syntax elements. When the input bits of $B_0$ and $B_1$ are respectively parsed into syntax elements completely, the syntax elements of $B_0$ and $B_1$ would need respectively one thread of the second decoding unit 940 to decode them into pixels values, as such, the first decoding unit 930 and the second decoding unit 940 can be independently operated with multiple threads for different pictures or slices so as to accelerate the speed of decoding process. In the other case, when the picture of encoded picture streams is determined by the determining unit 950 with multiple slices, the present invention takes use of multiple threads to do the decoding process of multiple slices of each picture if the picture contains more than one slice. Through the multi-threaded decoding process as described above, the decoding speed can be substantially increased, such that the efficiency of the apparatus in the present embodiment is enhanced.

Figure 10:
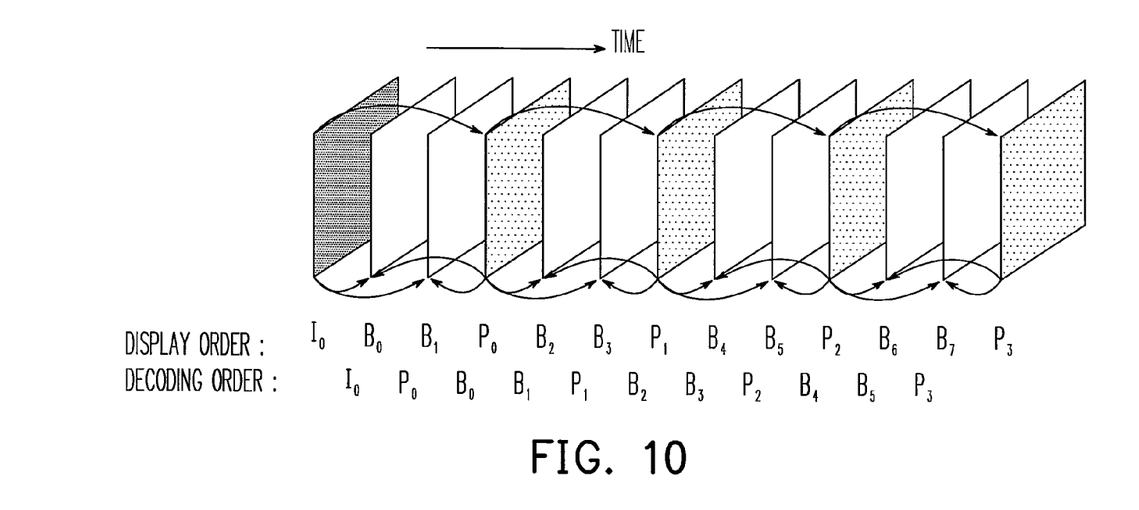
FIG. 10 is a schematic diagram illustrating the picture stream according to an embodiment of present invention.

In order to explain the concept of present invention more clearly, an actual exemplary embodiment is addressed. In the embodiment, the picture stream is assumed to be IBBPBBP . . . , wherein the I, P, B refers to I picture, P picture, and B picture, respectively. FIG. 10 is a schematic diagram illustrating the picture stream according to an embodiment of present invention. As illustrated, the display order of the pictures is $I_0$, $B_0$, $B_1$, $P_0$, $B_2$, $B_3$, $P_1$, $B_4$, $B_5$, $P_2$, $B_6$, $B_7$, and $P_3$. Accordingly, as defined in the video encoding/decoding standard, the decoding order would be $I_0$, $P_0$, $B_0$, $B_1$, $P_1$, $B_2$, $B_3$, $P_2$, $B_4$, $B_5$, and $P_3$.

Figure 11:
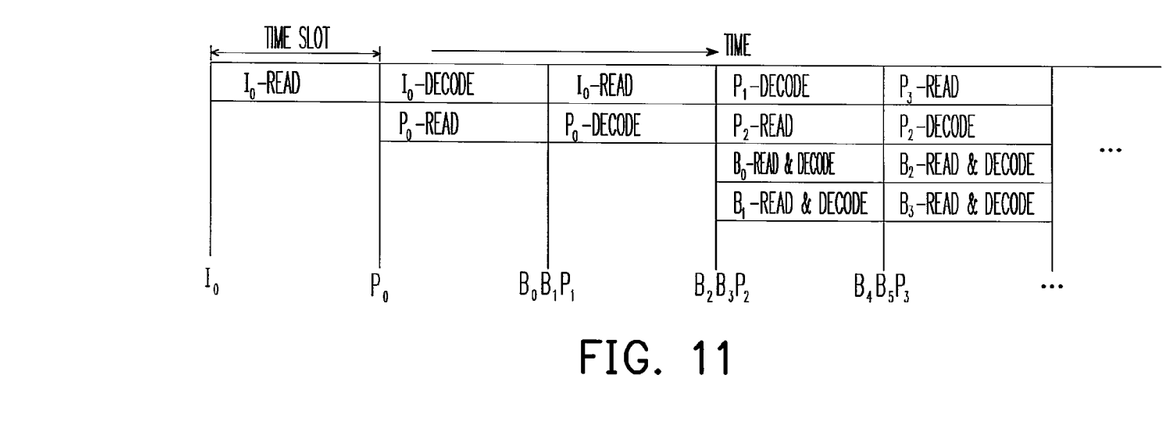
FIG. 11 is a schematic diagram illustrating the multi-threaded scheme by decoding order according to an embodiment of present invention.

FIG. 11 is a schematic diagram illustrating the decoding order for the multi-threaded scheme according to an embodiment of the present invention. Referring to FIG. 11, the unit of processing time is a time-slot. In the present embodiment, each time-slot has one thread at the least and four threads at the most, but is not limited to it.

As seen in FIG. 11, when the picture $I_0$ is inputted, the decoder uses one thread for parsing input bits of the picture $I_0$ into the syntax elements of the picture $I_0$ (denoted as $I_0$-READ). Then, when the picture $P_0$ is inputted, the decoder uses two threads to do the operation of decoding the syntax elements achieved by $I_0$-READ into pixel values of the picture $I_0$ (denoted as $I_0$-DECODE) and the operation of parsing input bits of the picture $P_0$ into the syntax elements of $P_0$ (denoted as $P_0$-READ). Next, when the picture $B_0$ is inputted, due to the B picture is a non-reference picture, the decoder parses its header and stores all NALUs (Network Abstraction Layer Unit) of this non-reference picture in order to read and decode later.

Then, the decoder continues to get a next picture. Next, the picture $B_1$ is inputted. It is also a non-reference picture here, so the decoder does the same process as $B_0$. Next, the picture $P_1$ is inputted. It is a reference picture, so the decoder uses two threads to do the operation of decoding the syntax elements achieved by $P_0$-READ into pixel values of $P_0$ (denoted as $P_0$-DECODE) and the operation of parsing input bits of the picture $P_1$ into the syntax elements of $P_1$(denoted as $P_1$-READ). However, $B_0$ and $B_1$ cannot be processed immediately because the reference picture of $B_0$ and $B_1$ is $P_0$, and at this moment, the decoder is just executing the decoding operation of $P_0$. As a result, the decoding operation of $B_0$ and $B_1$ must be postponed until $P_0$ is decoded completely, that is, moved to next time-slot.

Next, the picture $B_2$ and $B_3$ is inputted subsequently. They are also parsed and stored to the decoder. After that, the picture $P_2$ is inputted, so that the decoder uses four threads to do video decoding, one thread is for the operation of decoding the syntax elements achieved by $P_1$-READ into pixel values of $P_1$(denoted as $P_1$-DECODE), another thread is for the operation of parsing input bits of the picture $P_2$ into the syntax elements of $P_2$(denoted as $P_2$-READ), and the other two threads are respectively for parsing input bits of the picture into the syntax elements and decoding the syntax elements into pixel values of $B_0$ and $B_1$(respectively denoted as $B_0$-READ& DECODE, $B_1$-READ& DECODE). The same thing is happened to the picture $B_4$, $B_5$, and $P_3$. Therefore, the decoder also uses four threads to do video decoding, one thread is for the operation of decoding the syntax elements achieved by $P_2$-READ into pixel values of $P_2$(denoted as $P_2$-DECODE), another thread is for the operation of parsing input bits of the picture $P_3$ into the syntax elements of $P_3$(denoted as $P_3$-READ), and the other two threads are respectively for parsing input bits of the picture into the syntax elements and decoding the syntax elements into pixel values of $B_2$ and $B_3$(respectively denoted as $B_2$-READ& DECODE, $B_3$-READ& DECODE). As described above, the decoding process follow the similar rule depending on reference picture, preceding reference picture and non-reference picture on a picture by picture basis with multi-threaded scheme, such that the detailed description for the decoding of rest pictures in the picture stream is omitted here.

It deserves to be mentioned that according to experimental results, the processing time of the B picture is often half of the P picture. Therefore, in the present embodiment, the reading and decoding operations of the B picture are processed in the same time-slot to gain the best performance. However, in various embodiments, the reading and decoding operations of the B picture can also be processed in different time-slot.

In summary, the present invention takes use of multi-threaded processor and implements multiple threads to do the operation of parsing input bits into syntax elements of one picture and the operation of decoding syntax elements into pixel values of another picture in a parallel manner. Moreover, each of the slices in the pictures is also processed with one thread. As a result, the redundant time for waiting in a decoding sequence is saved, and therefore a more effective decoding method is obtained.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for performing multi-threaded video decoding, comprising:
    parsing input bits of a first picture of encoded picture streams into a plurality of syntax elements of the first picture;
    decoding the plurality of syntax elements of the first picture into pixel values and parsing input bits of a second picture of encoded picture streams into a plurality of syntax elements of the second picture in a parallel manner;
    determining whether the second picture has dependency on one or more other pictures while the step of parsing input bits of the second picture of encoded picture streams into a plurality of syntax elements of the second picture has been completed; and
    if the second picture has no dependency on one or more other pictures, decoding the plurality of syntax elements of the second picture into pixel values.

2. The method for performing multi-threaded video decoding according to claim 1, wherein the decoding of the second picture further comprises:
    if the second picture has dependency on one or more other pictures, decoding the plurality of syntax elements of the second picture into pixel values while the one or more other pictures referred by the decoding operation of the second picture have been decoded.

3. The method for performing multi-threaded video decoding according to claim 2, wherein the first picture comprises one of an intra-coded picture (I picture) and a predictive picture (P picture).

4. The method for performing multi-threaded video decoding according to claim 1, wherein the second picture comprises one of a predictive picture (P picture) and one or more bi-directional predictive picture (B picture).

5. The method for performing multi-threaded video decoding according to claim 1, further comprises determining whether the picture to be decoded includes a plurality of slices, and the multi-slice picture is decoded by multiple threads if the picture to be decoded includes a plurality of slices.

* * * * *

(12) EX PARTE REEXAMINATION CERTIFICATE (10676th)
United States Patent
Katsavounidis et al.

(10) Number: US 8,121,196 C1
(45) Certificate Issued: Aug. 11, 2015

(54) METHOD AND APPARATUS FOR MULTI-THREADED VIDEO DECODING

(75) Inventors: Ioannis Katsavounidis, Fremont, CA (US); Yu-Nien Chien, Fremont, CA (US); Chun-Huan Chuang, Fremont, CA (US); Chung-Tao Chu, Fremont, CA (US); Te-Chien Chen, Fremont, CA (US)

(73) Assignee: 8324450 DELAWARE LLC, Wilmington, DE (US)

Reexamination Request:
No. 90/013,217, May 13, 2014

Reexamination Certificate for:
Patent No.: 8,121,196
Issued: Feb. 21, 2012
Appl. No.: 11/556,161
Filed: Nov. 2, 2006

(51) Int. Cl.
*H04B 1/66* (2006.01)
*H04N 19/436* (2014.01)
*H04N 19/577* (2014.01)
*H04N 19/44* (2014.01)

(52) U.S. Cl.
CPC ............ *H04N 19/436* (2014.11); *H04N 19/44* (2014.11); *H04N 19/577* (2014.11)

(58) Field of Classification Search
None
See application file for complete search history.

(56) References Cited

To view the complete listing of prior art documents cited during the proceeding for Reexamination Control Number 90/013,217, please refer to the USPTO's public Patent Application Information Retrieval (PAIR) system under the Display References tab.

*Primary Examiner* — Stephen J Ralis (57) ABSTRACT

A method and an apparatus for performing multi-threaded video decoding are disclosed. The method takes use of a multi-threaded scheme to process an encoded picture stream on a picture by picture basis. In the method, multiple threads are used for performing video decoding at the same time, such as one thread for the operation of parsing input bits into syntax elements of one picture implemented by the first thread, another thread for the operation of decoding the parsed syntax elements of another picture into pixel values implemented by the second thread, and the other threads for the operations of the non-reference picture, such as bidirectional predictive picture, including parsing input bits into syntax elements and the subsequent operation of decoding the parsed syntax elements into pixel values. Therefore, the decoding speed is substantially increased, and the decoding efficiency is enhanced.

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-5, dependent on an amended claim, are determined to be patentable.

New claims 6-29 are added and determined to be patentable.

1. A method for performing multi-threaded video decoding, comprising:
   parsing input bits of a first picture of encoded picture streams into a plurality of syntax elements of the first picture;
   decoding the plurality of syntax elements of the first picture into pixel values and parsing input bits of a second picture of encoded picture streams into a plurality of syntax elements of the second picture in a parallel manner;
   determining whether the second picture has dependency on one or more other pictures while the step of parsing input bits of the second picture of encoded picture streams into a plurality of syntax elements of the second picture has been completed; [and]
   if the second picture has no dependency on one or more other pictures, decoding the plurality of syntax elements of the second picture into pixel values;
   *assigning a first thread to perform the parsing input bits of the first picture;*
   *assigning a second thread to perform the parsing input bits of the second picture,*
   *wherein the first and second threads operate in parallel, and*
   *wherein the first and second pictures comprise separate encoded video fields or frames; and*
   *assigning a third thread for performing both parsing input bits of a third picture into a plurality of syntax elements of the third picture and subsequent decoding of the plurality of syntax elements of the third picture into pixel values,*
   *wherein the third picture depends on one or both of the first and second pictures, and*
   *wherein the first, second and third pictures comprise separate encoded video fields or frames.*

*6. The method for performing multi-threaded video decoding according to claim 1, wherein parsing input bits of the first and second pictures into the plurality of syntax elements includes extracting at least a motion vector from the input bits for subsequent decoding of the first and second pictures, respectively.*

*7. The method for performing multi-threaded video decoding according to claim 1, wherein parsing input bits of the first and second pictures into the plurality of syntax elements includes identifying a picture type of the first and second pictures, respectively.*

*8. The method for performing multi-threaded video decoding according to claim 1, wherein parsing input bits of the first and second pictures into the plurality of syntax elements includes identifying a picture type of the first and second pictures, respectively, and extracting at least a picture type and a motion vector from the input bits.*

*9. The method for performing multi-threaded video decoding according to claim 1, wherein decoding the plurality of syntax elements of the first and second pictures into pixel values includes at least performing inverse quantization on the syntax elements parsed from the input bits of the first and second pictures, respectively.*

*10. The method for performing multi-threaded video decoding according to claim 1, wherein the plurality of syntax elements include at least two or more of picture start code, temporal reference, picture type, motion vector type, and motion vectors.*

*11. The method for performing multi-threaded video decoding according to claim 1, wherein the first and second pictures each comprise an entire video field or frame.*

*12. The method for performing multi-threaded video decoding according to claim 1, wherein the first and second pictures each consist essentially of a video field or frame encoded in accordance with H.264.*

*13. The method for performing multi-threaded video decoding according to claim 1, wherein the first and second pictures each consist essentially of a video field or frame encoded in accordance with MPEG-1.*

*14. The method for performing multi-threaded video decoding according to claim 1, wherein the first and second pictures each consist essentially of a video field or frame encoded in accordance with MPEG-2.*

*15. The method for performing multi-threaded video decoding according to claim 1, wherein the first and second pictures each consist essentially of a video field or frame encoded in accordance with MPEG-4.*

*16. The method for performing multi-threaded video decoding according to claim 1, wherein the first and second pictures each comprise a number of slices, each slice comprising a plurality of macroblocks.*

*17. The method for performing multi-threaded video decoding according to claim 1, further comprising:*
   *assigning a fourth thread for performing the decoding the plurality of syntax elements of the first picture into pixel values,*
   *wherein the second and fourth threads operate in parallel.*

*18. The method for performing multi-threaded video decoding according to claim 1, wherein determining whether the second picture has dependency on one or more other pictures includes postponing starting the decoding of the second picture until the determination has been made.*

*19. The method for performing multi-threaded video decoding according to claim 1, further comprising receiving the encoded picture streams from a network.*

*20. A method for performing multi-threaded video decoding, comprising:*
   *parsing input bits of a first picture of encoded picture streams into a plurality of syntax elements of the first picture;*
   *decoding the plurality of syntax elements of the first picture into pixel values and parsing input bits of a second picture of encoded picture streams into a plurality of syntax elements of the second picture in a parallel manner;*
   *determining whether the second picture has dependency on one or more other pictures while the step of parsing input bits of the second picture of encoded picture* streams into a plurality of syntax elements of the second picture has been completed; and if the second picture has no dependency on one or more other pictures, decoding the plurality of syntax elements of the second picture into pixel values, wherein the method is performed by a mobile phone.

21. A method for performing multi-threaded video decoding, comprising:

parsing input bits of a first picture of encoded picture streams into a plurality of syntax elements of the first picture;

decoding the plurality of syntax elements of the first picture into pixel values and parsing input bits of a second picture of encoded picture streams into a plurality of syntax elements of the second picture in a parallel manner;

determining whether the second picture has dependency on one or more other pictures while the step parsing input bits of the second picture of encoded picture streams into a plurality of syntax elements of the second picture has been completed; and if the second picture has no dependency on one or more other pictures, decoding the plurality of syntax elements of the second picture into pixel values, wherein the method is performed by a digital versatile disk player.

22. A method for performing multi-threaded video decoding, comprising:

parsing input bits of a first picture of encoded picture streams into a plurality of syntax elements of the first picture;

decoding the plurality of syntax elements of the first picture into pixel values and parsing input bits of a second picture of encoded picture streams into a plurality of syntax elements of the second picture in a parallel manner;

determining whether the second picture has dependency on one or more other pictures while the step of parsing input bits of the second picture of encoded picture streams into a plurality of syntax elements of the second picture has been completed; and if the second picture has no dependency on one or more other pictures, decoding the plurality of syntax elements of the second picture into pixel values, wherein the method is performed by a portable computer.

23. A method for performing multi-threaded video decoding, comprising:

parsing input bits of a first picture of encoded picture streams into a plurality of syntax elements of the first picture;

decoding the plurality of syntax elements of the first picture into pixel values and parsing input bits of a second picture of encoded picture streams into a plurality of syntax elements of the second picture in a parallel manner;

determining whether the second picture has dependency on one or more other pictures while the step of parsing input bits of the second picture of encoded picture streams into a plurality of syntax elements of the second picture has been completed; and if the second picture has no dependency on one or more other pictures, decoding the plurality of syntax elements of the second picture into pixel values, wherein the method is performed by a television.

24. A method for performing multi-threaded video decoding, comprising:

parsing input bits of a first picture of encoded picture streams into a plurality of syntax elements of the first picture;

decoding the plurality of syntax elements of the first picture into pixel values and parsing input bits of a second picture of encoded picture streams into a plurality of syntax elements of the second picture in a parallel manner;

determining whether the second picture has dependency on one or more other pictures while the step of parsing input bits of the second picture of encoded picture streams into a plurality of syntax elements of the second picture has been completed; and if the second picture has no dependency on one or more other pictures, decoding the plurality of syntax elements of the second picture into pixel values, wherein the method is performed by a personal digital assistant.

25. A method for performing multi-threaded video decoding, comprising:

parsing, by a first decoding unit, input bits of a first picture of encoded picture streams into a plurality of syntax elements of the first picture;

decoding, by a second decoding unit, the plurality of syntax elements of the first picture into pixel values and parsing input bits of a second picture of encoded picture streams into a plurality of syntax elements of the second picture in a parallel manner with the first decoding unit; and determining, by a determining unit, whether the second picture has dependency on one or more other pictures while the step of parsing input bits of the second picture of encoded picture streams into a plurality of syntax elements of the second picture has been completed, wherein if the second picture has no dependency on one or more other pictures, the second decoding unit decodes the plurality of syntax elements of the second picture into pixel values, wherein the first decoding unit, the second decoding unit, and the determining unit are in a mobile phone.

26. A method for performing multi-threaded video decoding, comprising:

parsing, by a first decoding unit, input bits of a first picture of encoded picture streams into a plurality of syntax elements of the first picture;

decoding, by a second decoding unit, the plurality of syntax elements of the first picture into pixel values and parsing input bits of a second picture of encoded picture streams into a plurality of syntax elements of the second picture in a parallel manner with the first decoding unit; and determining, by a determining unit, whether the second picture has dependency on one or more other pictures while the step of parsing input bits of the second picture of encoded picture streams into a plurality of syntax elements of the second picture has been completed, wherein if the second picture has no dependency on one or more other pictures, the second decoding unit decodes the plurality of syntax elements of the second picture into pixel values, wherein the first decoding unit, the second decoding unit, and the determining unit are in a digital versatile disk player.

27. A method for performing multi-threaded video decoding, comprising:

parsing, by a first decoding unit, input bits of a first picture of encoded picture streams into a plurality of syntax elements of the first picture;

decoding, by a second decoding unit, the plurality of syntax elements of the first picture into pixel values and parsing input bits of a second picture of encoded picture streams into a plurality of syntax elements of the second picture in a parallel manner with the first decoding unit; and determining, by a determining unit, whether the second picture has dependency on one or more other pictures while the step of parsing input bits of the second picture of encoded picture streams into a plurality of syntax elements of the second picture has been completed, wherein if the second picture has no dependency on one or more other pictures, the second decoding unit decodes the plurality of syntax elements of the second picture into pixel values, wherein the first decoding unit, the second decoding unit, and the determining unit are in a portable computer.

28. A method for performing multi-threaded video decoding, comprising:

parsing, by a first decoding unit, input bits of a first picture of encoded picture streams into a plurality of syntax elements of the first picture;

decoding, by a second decoding unit, the plurality of syntax elements of the first picture into pixel values and parsing input bits of a second picture of encoded picture streams into a plurality of syntax elements of the second picture in a parallel manner with the first decoding unit; and determining, by a determining unit, whether the second picture has dependency on one or more other pictures while the step of parsing input bits of the second picture of encoded picture streams into a plurality of syntax elements of the second picture has been completed, wherein if the second picture has no dependency on one or more other pictures, the second decoding unit decodes the plurality of syntax elements of the second picture into pixel values, wherein the first decoding unit, the second decoding unit, and the determining unit are in a television.

29. A method for performing multi-threaded video decoding, comprising:

parsing, by a first decoding unit, input bits of a first picture of encoded picture streams into a plurality of syntax elements of the first picture;

decoding, by a second decoding unit, the plurality of syntax elements of the first picture into pixel values and parsing input bits of a second picture of encoded picture streams into a plurality of syntax elements of the second picture in a parallel manner with the first decoding unit; and determining, by a determining unit, whether the second picture has dependency on one or more other pictures while the step of parsing input bits of the second picture of encoded picture streams into a plurality of syntax elements of the second picture has been completed, wherein if the second picture has no dependency on one or more other pictures, the second decoding unit decodes the plurality of syntax elements of the second picture into pixel values, wherein the first decoding unit, the second decoding unit, and the determining unit are in a personal digital assistant.

* * * * *